(12) United States Patent
Tummala et al.

(10) Patent No.: US 9,165,003 B1
(45) Date of Patent: Oct. 20, 2015

(54) TECHNIQUE FOR PERMITTING MULTIPLE VIRTUAL FILE SYSTEMS HAVING THE SAME IDENTIFIER TO BE SERVED BY A SINGLE STORAGE SYSTEM

(75) Inventors: Narayana R. Tummala, Gibsonia, PA (US); Michael Kazar, Pittsburgh, PA (US); Vasilis Apostolides, Wexford, PA (US); Bruce W. Leverett, Pittsburgh, PA (US)

(73) Assignee: NetApp, Inc., Sunnyvale, CA (US)

( * ) Notice: Subject to any disclaimer, the term of this patent is extended or adjusted under 35 U.S.C. 154(b) by 1660 days.

(21) Appl. No.: 10/998,433

(22) Filed: Nov. 29, 2004

(51) Int. Cl.
*G06F 17/30* (2006.01)

(52) U.S. Cl.
CPC .... *G06F 17/30091* (2013.01); *G06F 17/30067* (2013.01)

(58) Field of Classification Search
CPC .................. G06F 17/30067; G06F 17/30091; G06F 17/30106; G06F 17/30115; G06F 2003/0697; G06F 3/0601; G06F 11/1435; G06F 11/2005; G06F 17/30171; G06F 2201/84; G06F 3/0605; G06F 3/0643; G06F 3/0652
USPC ........................ 707/1–10, 200–205
See application file for complete search history.

(56) References Cited

U.S. PATENT DOCUMENTS

| | | | |
|---|---|---|---|
| 4,570,217 A | 2/1986 | Allen et al. | |
| 5,124,987 A | 6/1992 | Milligan et al. | |
| 5,163,131 A | 11/1992 | Row et al. | |
| 5,202,979 A | 4/1993 | Hillis et al. | |
| 5,278,979 A | 1/1994 | Foster et al. | |
| 5,403,667 A | 4/1995 | Simoens | |
| 5,581,724 A | 12/1996 | Belsan et al. | |
| 5,860,146 A * | 1/1999 | Vishin et al. | 711/207 |
| 6,061,770 A | 5/2000 | Franklin | |
| 6,081,875 A | 6/2000 | Clifton et al. | |
| 6,148,412 A * | 11/2000 | Cannon et al. | 714/6 |
| 6,341,341 B1 | 1/2002 | Grummon et al. | |
| 6,405,284 B1 * | 6/2002 | Bridge | 711/114 |
| 6,629,108 B2 * | 9/2003 | Frey et al. | 1/1 |
| 6,668,264 B1 | 12/2003 | Patterson et al. | |
| 6,782,453 B2 * | 8/2004 | Keltcher et al. | 711/133 |
| 6,889,228 B1 | 5/2005 | Federwisch | |
| 6,889,249 B2 * | 5/2005 | Miloushev et al. | 709/213 |
| 6,915,316 B1 | 7/2005 | Patterson et al. | |
| 6,993,539 B2 | 1/2006 | Federwisch et al. | |
| 7,007,046 B2 | 2/2006 | Manley et al. | |
| 7,010,553 B2 | 3/2006 | Chen et al. | |
| 7,024,427 B2 * | 4/2006 | Bobbitt et al. | 707/200 |
| 7,039,663 B1 | 5/2006 | Federwisch et al. | |
| 7,043,485 B2 | 5/2006 | Manley et al. | |
| 7,127,577 B2 | 10/2006 | Koning et al. | |

(Continued)

OTHER PUBLICATIONS

Veritas Volume Manger Storage Administrator 3.2, Administrator's Guide, Jul. 2001.*

(Continued)

*Primary Examiner* — Shew-Fen Lin
(74) *Attorney, Agent, or Firm* — Cesari and McKenna, LLP

(57) ABSTRACT

A technique for permitting multiple virtual file system having the same VFS identifier to be served by a single storage system. A data frame descriptor data structure is modified to include a storage pool index value that indexes into a storage pool array to identify a storage pool descriptor. The storage pool (SP) descriptor includes a SP ID, which is used in conjunction with a VFS ID to uniquely identify the VFS to which dirtied data is to be written.

10 Claims, 12 Drawing Sheets

(56) References Cited

U.S. PATENT DOCUMENTS

| | | | |
|---|---|---|---|
| 7,139,809 B2* | 11/2006 | Husain et al. | 709/213 |
| 7,139,811 B2* | 11/2006 | Lev Ran et al. | 709/217 |
| 7,203,796 B1 | 4/2007 | Muppalaneni et al. | |
| 7,225,204 B2 | 5/2007 | Manley et al. | |
| 7,281,032 B2* | 10/2007 | Kodama | 709/217 |
| 7,325,109 B1 | 1/2008 | Muppalaneni et al. | |
| 2002/0116593 A1* | 8/2002 | Kazar et al. | 711/202 |
| 2004/0107422 A1* | 6/2004 | Cabrera et al. | 719/310 |
| 2004/0267752 A1* | 12/2004 | Wong et al. | 707/9 |
| 2005/0278383 A1* | 12/2005 | Kazar et al. | 707/200 |
| 2006/0106827 A1* | 5/2006 | Brown et al. | 707/100 |
| 2006/0184587 A1 | 8/2006 | Federwisch et al. | |
| 2006/0218210 A1 | 9/2006 | Sarma et al. | |
| 2008/0040483 A1* | 2/2008 | Nakatani et al. | 709/226 |
| 2009/0006792 A1 | 1/2009 | Federwisch et al. | |
| 2009/0030983 A1 | 1/2009 | Malaiyandi et al. | |

OTHER PUBLICATIONS

Window 2000 Pro: The Missing Manual, O'Reilly Publisher, Nov. 2000.*

Mike Kezar,"Spinserver™ Systems and Linux® Compute Farms Spinserver™ Systems and Linux® Compute Farms", Feb. 2004.*

Akyurek, Sedat, *Placing Replicated Data to Reduce Seek Delays*, Department of Computer Science, University of Maryland, UMIACS-TR-91-121, CS-TR-2746, Aug. 1991.

Bitton, Dina, *Disk Shadowing*, Proceedings of the 14$^{th}$ VLDB Conference, LA, CA 1988.

Chaudhuri, Surajit, et al., *Self-Tuning Technology in Microsoft SQL Server*, Data Engineering Journal 22, Feb. 1999 pp. 20-27.

Chutani, Sailesh, et al., *The Episode File System*, In Proceedings of the USENIX Winter 1992.

Coyne, Robert A., et al., *Storage Systems for National Information Assets*, Proc. Supercomputing 92, Minneapolis, Nov. 1992, pp. 626-633.

Finlayson, Ross S., et al., *Log Files: An Extended File Service Exploiting Write-Once Storage* Department of Computer Science, Stanford University, Report No. STAN-CS-87-1177, Sep. 1987.

Gray, Jim, et al., *The Recovery Manager of the System R Database Manager*, ACM Computing Surveys, (13)2:223-242 1981.

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael L., et al., *DEcorum File System Architectural Overview*, USENIX Summer Conference, Anaheim, California, 1990.

Kemper, Alfons, et al., *Performance Tuning for SAP R/3*, Data Engineering Journal 22, Feb. 1999 pp. 33-40.

Kent, Jack et al., *Optimizing Shadow Recovery Algorithms*, IEEE Transactions on Software Engineering, 14( 2): 155-168 , Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 Sep. 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software-Practice and Experience, 21(12):1289-1299 1991.

Rosenblum, Mendel, et al., *The LFS Storage Manager*, Computer Science Division, Electrical Engineering and Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, Feb. 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, Feb. 1999 pp. 41-47.

Sidebotham, Bob, *Volumes: The Andrew File System Data Structuring Primitive*, EEUG Conference Proceedings, Manchester, UK, Autumn 1986.

Subramanian, Muralidhar, et al., *Performance Challenges in Object-Relational DBMSs*, Data Engineering Journal 22, Feb. 1999 pp. 28-32.

Weikum, Gerhard, et al., *Towards Self-Tuning Memory Management for Data Servers*, Data Engineering Journal 22, Feb. 1999 pp. 3-11.

West, Michael, et al. *The ITC Distributed File System: Prototype and Experience*, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

* cited by examiner

TECHNIQUE FOR PERMITTING MULTIPLE VIRTUAL FILE SYSTEMS HAVING THE SAME IDENTIFIER TO BE SERVED BY A SINGLE STORAGE SYSTEM

FIELD OF THE INVENTION

The present invention is directed to file systems and, in particular to permitting multiple data containers having the same data container identifier to be served by a single storage system.

BACKGROUND OF THE INVENTION

A storage system is a computer that provides storage service relating to the organization of information on storage devices, such as disks. The storage system may be deployed within a network attached storage (NAS) environment and, as such, may be embodied as a file server. The file server or filer includes a storage operating system that implements a file system to logically organize the information as a hierarchical structure of directories and files on the disks. Each "on-disk" file may be implemented as a set of data structures, e.g., disk blocks, configured to store information. A directory, on the other hand, may be implemented as a specially formatted file in which information about other files and directories are stored.

A filer may be further configured to operate according to a client/server model of information delivery to thereby allow many clients to access files stored on a server, e.g., the filer. In this model, the client may comprise an application, such as a database application, executing on a computer that "connects" to the filer over a computer network, such as a point-to-point link, shared local area network (LAN), wide area network (WAN), or virtual private network (VPN) implemented over a public network such as the Internet. Each client may request the services of the file system on the filer by issuing file system protocol messages to the filer over the network.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as meta-data, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the SpinFS file system available from Network Appliance, Inc. of Sunnyvale, Calif. The SpinFS file system utilizes a write anywhere technique for user and directory data but writes metadata in place. The SpinFS file system is implemented within a storage operating system having a protocol stack and associated disk storage.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume, file system and virtual file system (VFS) shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. As described herein, a volume typically comprises at least one data disk and one associated parity disk (or possibly data/parity) partitions in a single disk) arranged according to a RAID 4, or equivalent high-reliability, implementation.

A common high availability feature of a storage system is the ability to generate one or more mirrors of a base VFS on one or more storage systems that are remote to the base VFS. Typically, the mirror VFS's reside within multiple storage pools that sit within a global name space. A storage pool is illustratively a collection of one or more logical unit numbers (LUNs) that is organized into a logically named entity owned by a storage system. Each mirror VFS represents a point-in-time image of the base VFS and is identified by the same virtual file system ID (VFS ID) as the base VFS. In other words, the mirror VFS's do not have unique identifiers, but rather all share the same VFS ID of the base VFS. Therefore, each storage pool that hosts a mirror VFS is serviced by a different storage system or component thereof, such as a storage controller to thereby prevent addressing problems associated with having multiple data containers with identical IDs.

Another high availability feature of a storage system is the ability to move a storage pool from one storage controller to another storage controller. Such a move may occur as a result of load balancing or failover caused by an error condition on a storage controller. As a result, two or more storage pools having mirror VFS's with identical VFS IDs may be owned by the same storage controller and, as such, are indistinguishable. To avoid further confusion, only one of the mirrors is mounted to the storage system at a time. Other mirror VFS's are not mounted to the storage system, thus breaking the mirroring relationship for those mirror VFS's that are not mounted, thereby halting updates to those mirror VFS's during the time that they are not mounted. Thus, the mirrors that are not mounted become inconsistent with the mirror that is mounted.

SUMMARY OF THE INVENTION

The present invention overcomes the disadvantages of the prior art providing a technique for permitting a storage system to concurrently service client requests directed to a plurality of virtual file systems (VFS's) having identical VFS identifiers. To that end, the inventive technique supports processing of both read requests to retrieve data from the VFS and operations to store dirtied data to the VFS's. When processing read requests directed to a VFS mirror, the storage system selects the most recently modified VFS mirror from which to retrieve the requested data. This selection is made by examining, e.g., VFS meta data stored in an inode describing the VFS. This aspect of the technique provides transparent client access to the VFS mirrors and ensures that clients receive the most up to date data in response to the read request.

When processing data associated with a VFS, a data frame descriptor data structure, which is utilized for tracking in-memory data buffers, is modified to include a storage pool (SP) index value. The SP index value is utilized to access an entry of a SP index array to identify a SP descriptor. The SP descriptor includes a SP identifier that uniquely identifies the storage pool associated with the contents of the data buffer. Thus, the data frame descriptor includes meta data to identify the VFS and the storage pool associated with the in-memory buffer. When a data buffer is dirtied by, e.g., a change in meta data due to a file system operation so that the in-memory data does not correspond to the on-disk data, the data frame descriptor is configured with the appropriate SP index to uniquely identify the appropriate VFS mirror that is modified. The storage system utilizes the combination of the VFS ID from the data frame descriptor and the SP ID from the SP index value to differentiate among a plurality of VFS's with identical VFS IDs.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Cluster Environment

Figure 1:
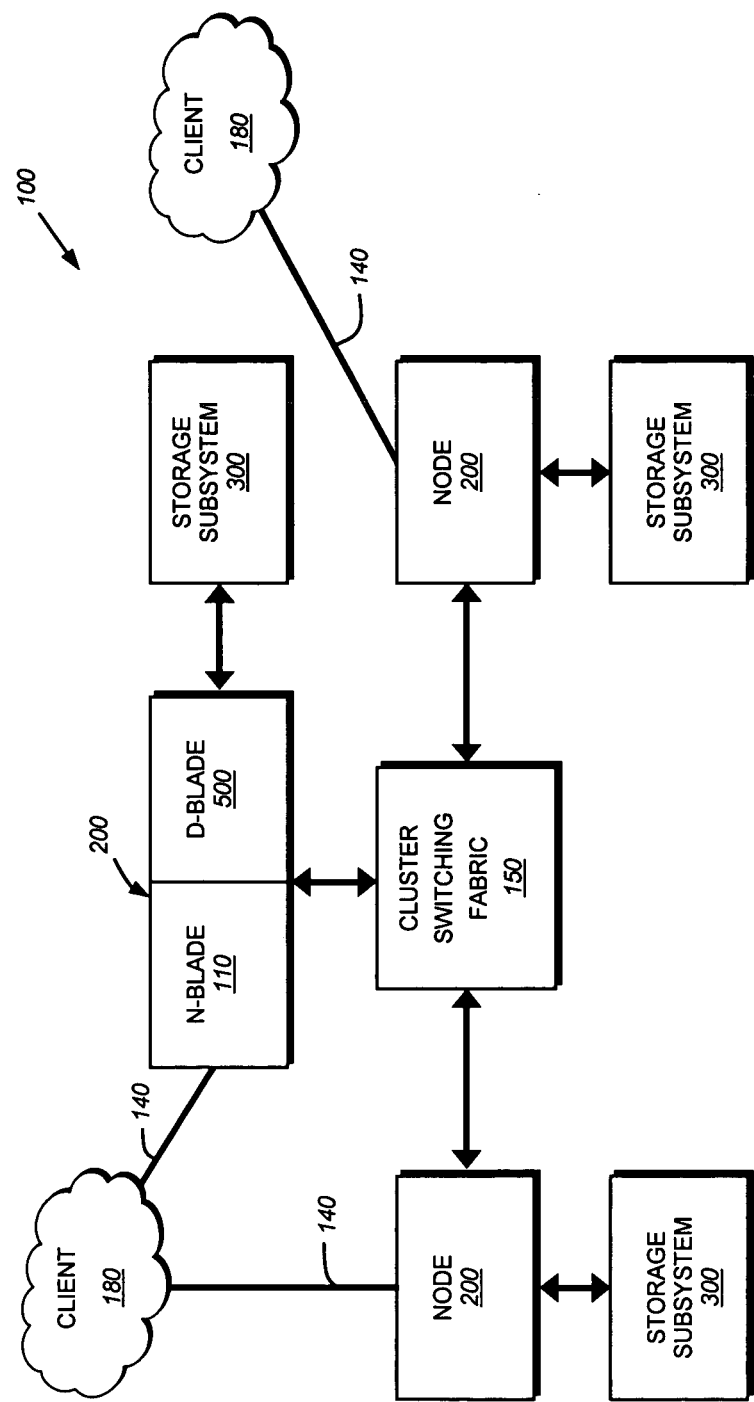
FIG. 1 is a schematic block diagram of a plurality of nodes interconnected as a cluster that may be advantageously used with the present invention.

FIG. 1 is a schematic block diagram of a plurality of nodes 200 interconnected as a cluster 100 and configured to provide storage service relating to the organization of information on storage devices of a storage subsystem. The nodes 200 comprise various functional components that cooperate to provide a distributed Spin File System (SpinFS) architecture of the cluster 100. To that end, each node 200 is generally organized as a network element (N-blade 110) and a disk element (D-blade 500). The N-blade 110 includes a plurality of ports that couple the node 200 to clients 180 over a computer network 140, while each D-blade 500 includes a plurality of ports that connect the node to a storage subsystem 300. The nodes 200 are interconnected by a cluster switching fabric 150 which, in the illustrative embodiment, may be embodied as a Gigabit Ethernet switch. The distributed SpinFS architecture is generally described in U.S. Patent Application Publication No. US 2002/0116593 titled *Method and System for Responding to File System Requests*, by M. Kazar et al. published Aug. 22, 2002.

B. Storage Systems

Figure 2:
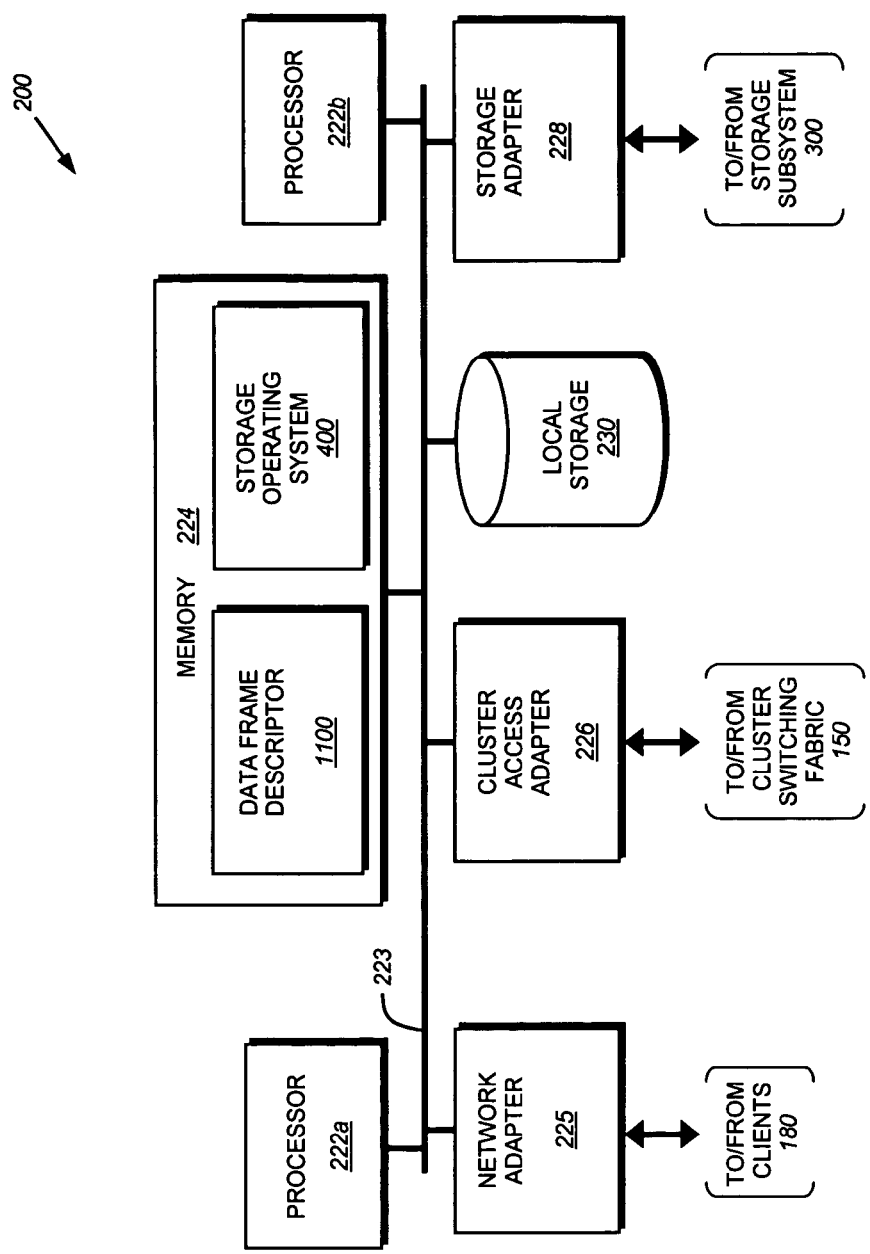
FIG. 2 is a schematic block diagram of a node that may be advantageously used with the present invention.

FIG. 2 is a schematic block diagram of a node 200 that is illustratively embodied as a storage system server comprising a plurality of processors 222, a memory 224, a network adapter 225, a cluster access adapter 226, a local storage 230 and a storage adapter 228 interconnected by a system bus 223. The local storage 230 is utilized by the node to store local configuration information (i.e. management data), including its local copy of a replicated database (RDB) 850 (see FIG. 8). The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein.

Each node 200 is illustratively embodied as a dual processor server system executing a storage operating system 400 that provides a file system configured to logically organize the information as a hierarchical structure of named directories and files on storage subsystem 300. However, it will be apparent to those of ordinary skill in the art that the node 200 may alternatively comprise a single or more than two processor system. Illustratively, one processor 222a executes the functions of the N-blade 110 on the node, while the other processor 222b executes the functions of the D-blade 500. It should be noted that a node may comprise any number of N and D-blades. As such, the description of a node having one N-blade and one D-blade should be taken as exemplary only.

In the illustrative embodiment, the memory 224 comprises storage locations that are addressable by the processors and adapters for storing software program code and data structures, such as data frame descriptors 1100, associated with the present invention. The processor and adapters may, in turn, comprise processing elements and/or logic circuitry configured to execute the software code and manipulate the data structures. The storage operating system 400, portions of which are typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the inventive system and method described herein.

The network adapter 225 comprises a plurality of ports adapted to couple the node 200 to one or more clients 180 over point-to-point links, wide area networks, virtual private networks implemented over a public network (Internet) or a shared local area network, hereinafter referred to as an Ethernet computer network 140. Therefore, the network adapter 225 may comprise a network interface card (NIC) having the mechanical, electrical and signaling circuitry needed to connect the node to the network. For such a network attached storage (NAS) based network environment, the clients are configured to access information stored on the node 200 as files. The clients 180 communicate with each node over network 140 by exchanging discrete frames or packets of data according to pre-defined protocols, such as the Transmission Control Protocol/Internet Protocol (TCP/IP).

The storage adapter 228 cooperates with the storage operating system 400 executing on the node 200 to access information requested by the clients. The information may be stored on disks or other similar media adapted to store information. The storage adapter comprises a plurality of ports having input/output (I/O) interface circuitry that couples to the disks over an I/O interconnect arrangement, such as a conventional high-performance, Fibre Channel (FC) link topology. The information is retrieved by the storage adapter and, if necessary, processed by the processor 222 (or the adapter 228 itself) prior to being forwarded over the system bus 223 to the network adapter 225 where the information is formatted into packets or messages and returned to the clients.

Figure 3:
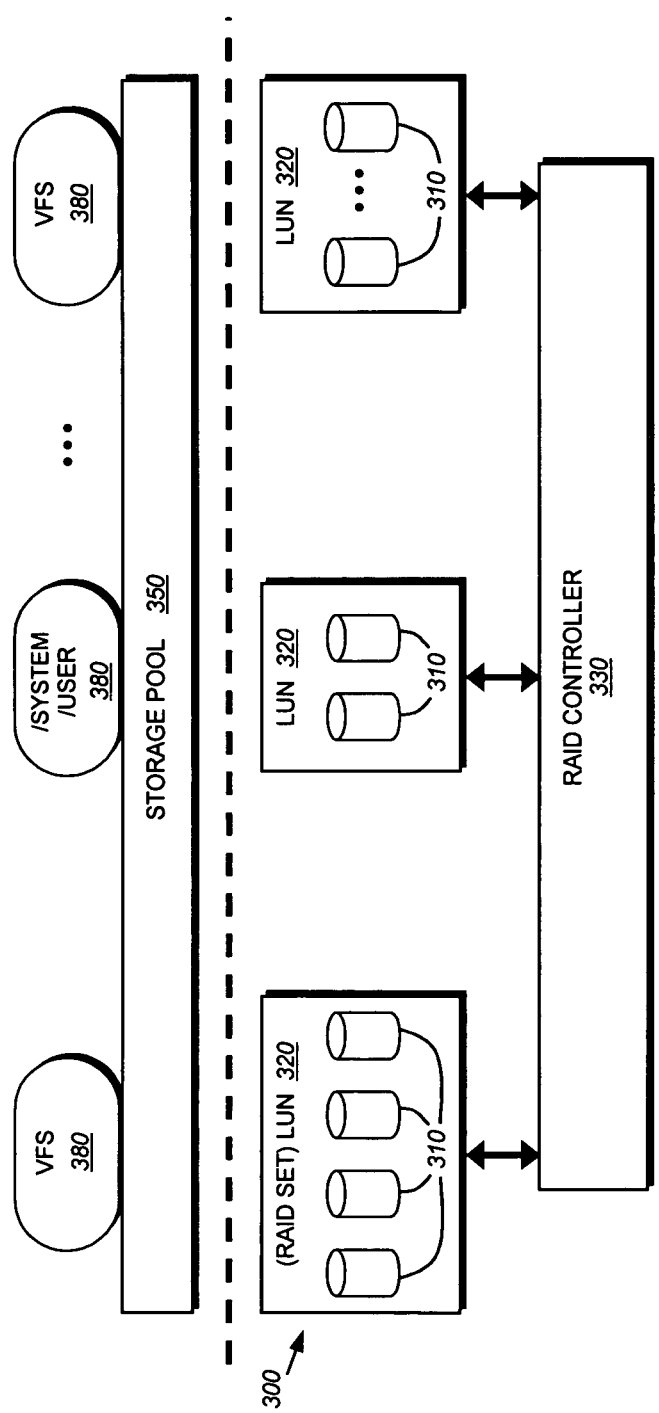
FIG. 3 is a schematic block diagram illustrating the storage subsystem that may be advantageously used with the present invention.

FIG. 3 is a schematic block diagram illustrating the storage subsystem 300 that may be advantageously used with the present invention. Storage of information on the storage subsystem 300 is illustratively implemented as a plurality of storage disks 310 defining an overall logical arrangement of disk space. The disks are further organized as one or more groups or sets of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may used in accordance with the present invention.

Each RAID set is illustratively configured by one or more RAID controllers 330. The RAID controller 330 exports a RAID set as a logical unit number (LUN 320) to the D-blade 500, which writes and reads blocks to and from the LUN 320. One or more LUNs are illustratively organized as a storage pool 350, wherein each storage pool 350 is "owned" by a D-blade 500 in the cluster 100. Each storage pool 350 is further organized as a plurality of virtual file systems (VFS's 380), each of which is also owned by the D-blade. Each VFS 380 may be organized within the storage pool according to a hierarchical policy that, among other things, allows the VFS to be dynamically moved among nodes of the cluster to, for example, control load among individual storage pools.

In the illustrative embodiment, a VFS 380 is synonymous with a volume and comprises a root directory, as well as a number of subdirectories and files. A group of VFS's may be composed into a larger namespace. For example, a root directory ("/") may be contained within a root VFS, which is the VFS that begins a translation process from a pathname associated with an incoming request to actual data (file) in a file system, such as the SpinFS file system. The root VFS may contain a directory ("system") or a mount point ("user"). A mount point is a SpinFS object used to "vector off" to another VFS and which contains the name of that vectored VFS. The file system may comprise one or more VFS's that are "stitched together" by mount point objects.

C. Storage Operating System

To facilitate access to the disks 310 and information stored thereon, the storage operating system 400 implements a write-anywhere file system, such as the SpinFS file system, which logically organizes the information as a hierarchical structure of named directories and files on the disks. However, it is expressly contemplated that any appropriate storage operating system, including a write in-place file system, may be enhanced for use in accordance with the inventive principles described herein. Each "on-disk" file may be implemented as set of disk blocks configured to store information, such as data, whereas the directory may be implemented as a specially formatted file in which names and links to other files and directories are stored.

As used herein, the term "storage operating system" generally refers to the computer-executable code operable on a computer that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the inventive system and method described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 4:
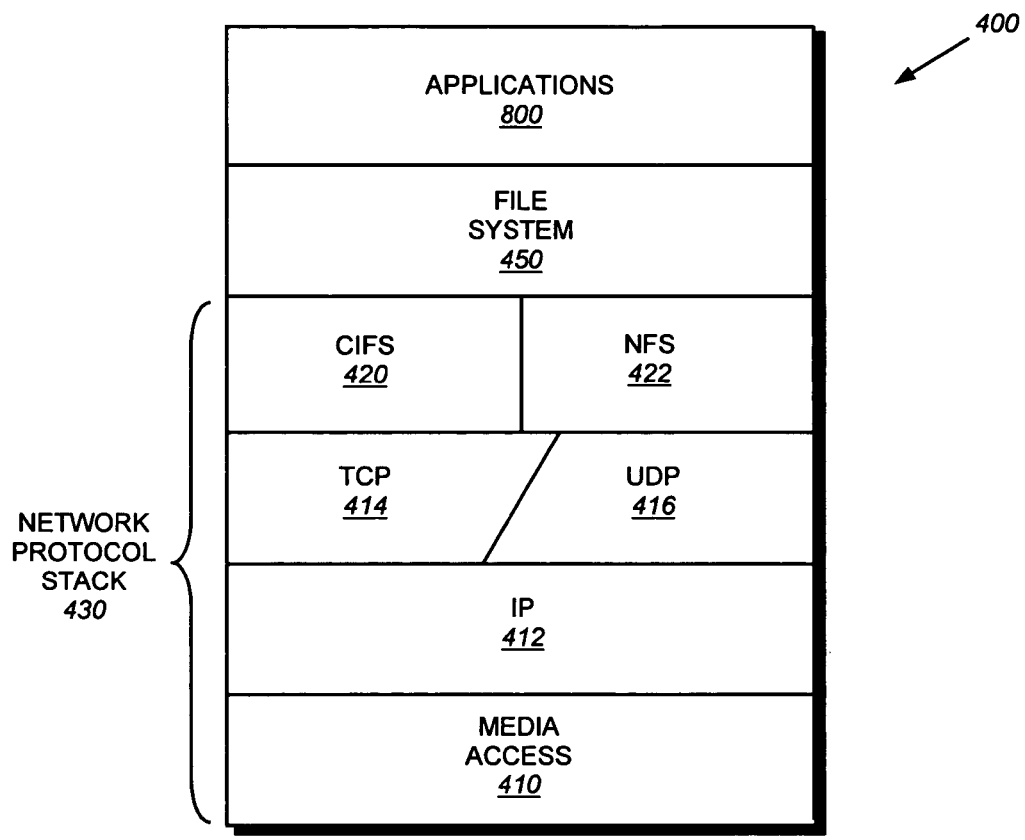
FIG. 4 is a partial schematic block diagram of a storage operating system that may be advantageously used with the present invention.

FIG. 4 is a partial schematic block diagram of the storage operating system 400 that may be advantageously used with the present invention. The storage operating system comprises a series of software layers organized to form an integrated network protocol stack 430 that provides a data path for clients to access information stored on the node 200 using file access protocols. The protocol stack includes a media access layer 410 of network drivers (e.g., gigabit Ethernet drivers) that interfaces to network protocol layers, such as the IP layer 412 and its supporting transport mechanisms, the TCP layer 414 and the User Datagram Protocol (UDP) layer 416. A file system protocol layer provides multi-protocol file access to a file system 450 (the SpinFS file system) and, thus, includes support for the CIFS protocol 420 and the NFS protocol 422. It should be noted that while this description is written in terms of CIFS and NFS, the principles of the present invention may be utilized with any appropriate protocol. As such, the description of CIFS and NFS should be taken as exemplary only. As described further herein, a plurality of management processes executes as user mode applications 800.

In the illustrative embodiment, the processors 222 share various resources of the node 200, including the storage operating system 400. To that end, the N-blade 110 executes the integrated network protocol stack 430 of the operating system 400 to thereby perform protocol termination with respect to a client issuing incoming NFS/CIFS file access request packets over the network 150. The NFS/CIFS layers of the network protocol stack function as NFS/CIFS servers 422, 420 that translate NFS/CIFS requests from a client into SpinFS protocol requests used for communication with the D-blade 500. The SpinFS protocol is a file system protocol that provides operations related to those operations contained within the incoming file access packets. Local communication between an N-blade and D-blade of a node is preferably effected through the use of message passing between the blades, while remote communication between an N-blade and D-blade of different nodes occurs over the cluster switching fabric 150.

D. D-Blade

Figure 5:
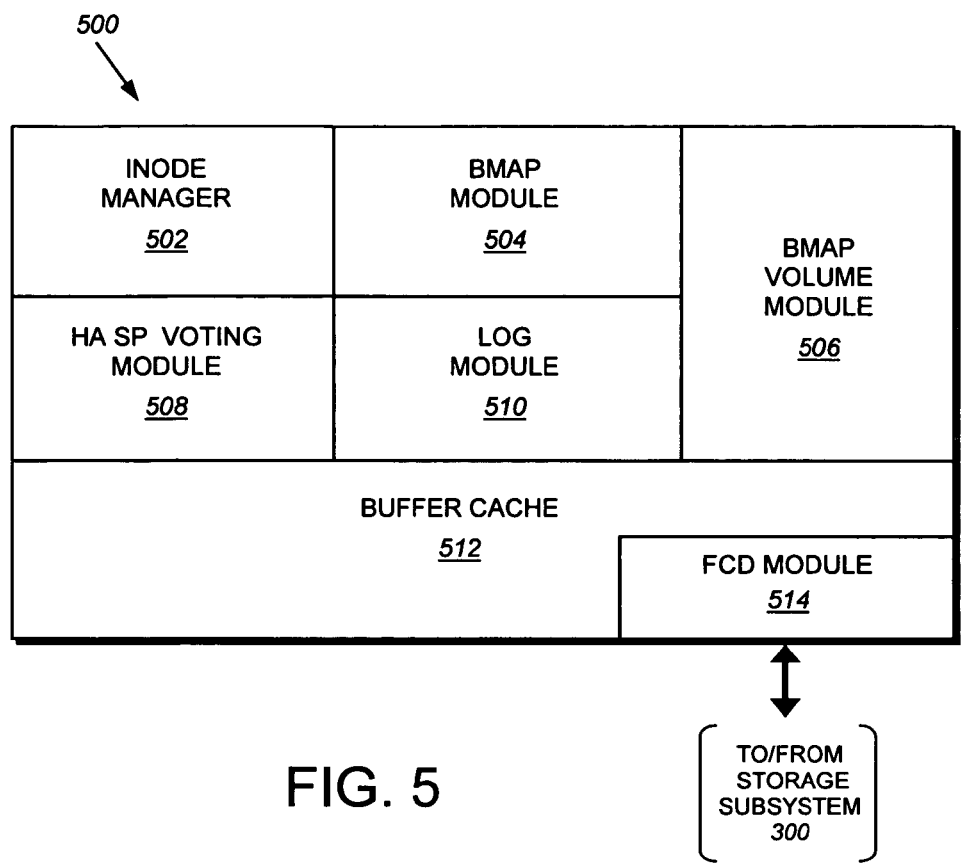
FIG. 5 is a schematic block diagram of a D-blade that may be advantageously used with the present invention.

Specifically, the NFS and CIFS servers of an N-blade 110 convert the incoming file access requests into SpinFS requests that are processed by the D-blades 500 of the cluster 100. Each D-blade 500 provides a disk interface function through execution of the SpinFS file system 450. In the illustrative cluster 100, the file systems 450 cooperate to provide a single SpinFS file system image across all of the D-blades in the cluster. Thus, any network port of an N-blade that receives a client request can access any file within the single file system image located on any D-blade 500 of the cluster. FIG. 5 is a schematic block diagram of the D-blade 500 comprising a plurality of functional components including a file system processing module (the inode manager 502), a logical-oriented block processing module (the Bmap module 504) and a Bmap volume module 506. The inode manager 502 is the processing module that implements the SpinFS file system 450, whereas the Bmap module 504 is responsible for all block allocation functions associated with a write anywhere policy of the file system 450, including reading and writing all data to and from the RAID controller 330 of storage subsystem 300. The Bmap volume module 506, on the other hand, implements all VFS operations in the cluster 100, including creating and deleting a VFS, mounting and unmounting a VFS in the cluster, moving a VFS, as well as cloning (snapshotting) and mirroring a VFS. The D-blade also includes a high availability storage pool (HA SP) voting module 508, a log module (manager) 510, a buffer cache 512 and a fiber channel device driver (FCD) module 514.

E. SpinFS

Figure 6:
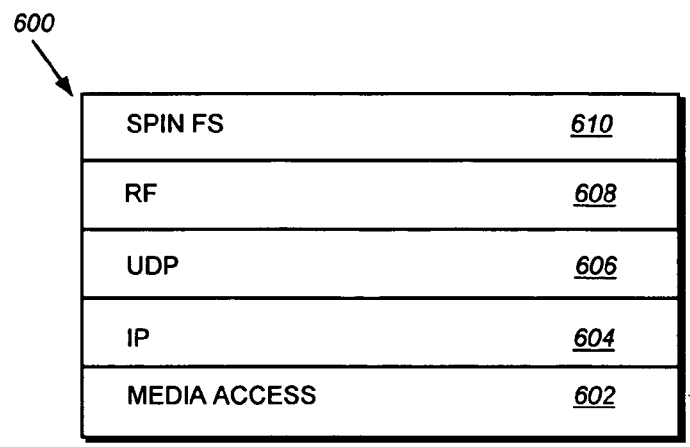
FIG. 6 is a schematic block diagram illustrating the format of a SpinFS request that may be advantageously used with the present invention.

The NFS and CIFS servers on the N-blade 110 translate respective NFS and CIFS requests into SpinFS primitive operations contained within SpinFS packets (requests). FIG. 6 is a schematic block diagram illustrating the format of a SpinFS request 600 that illustratively includes a media access layer 602, an IP layer 604, a UDP layer 606, an RF layer 608 and a SpinFS protocol layer 610. As noted, the SpinFS protocol 610 is a file system protocol that provides operations, related to those operations contained within ins coming file access packets, to access files stored on the cluster 100. Illustratively, the SpinFS protocol 610 is datagram based and, as such, involves transmission of packets or "envelopes" in a reliable manner from a source (e.g., an N-blade) to a destination (e.g., a D-blade). The RF layer 608 implements a reliable transport protocol that is adapted to process such envelopes in accordance with a connectionless protocol, such as UDP 606.

Figure 7:
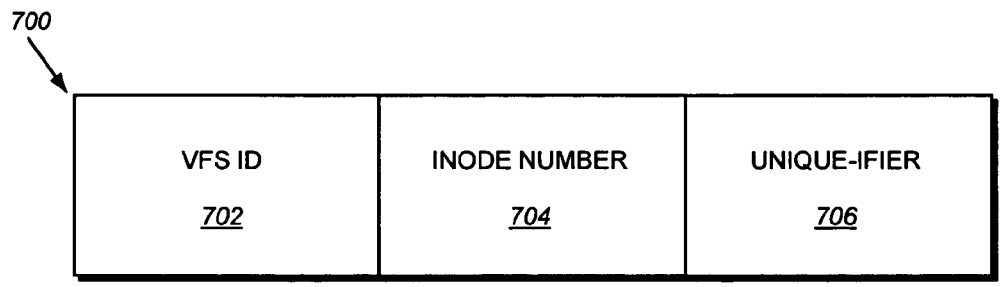
FIG. 7 is a schematic block diagram illustrating the format of a file handle that may be advantageously used with the present invention.

Files are accessed in the SpinFS file system 450 using a file handle. FIG. 7 is a schematic block diagram illustrating the format of a file handle 700 including a VFS ID field 702, an inode number field 704 and a unique-ifier field 706. The VFS ID field 702 contains an identifier of a VFS that is unique (global) within the entire cluster 100. The inode number field 704 contains an inode number of a particular inode within an inode file of a particular VFS. The unique-ifier field 706 contains a monotonically increasing number that uniquely identifies the file handle 700, particularly in the case where an inode number has been deleted, reused and reassigned to a new file. The unique-ifier distinguishes that reused inode number in a particular VFS from a potentially previous use of those fields.

Figure 8:
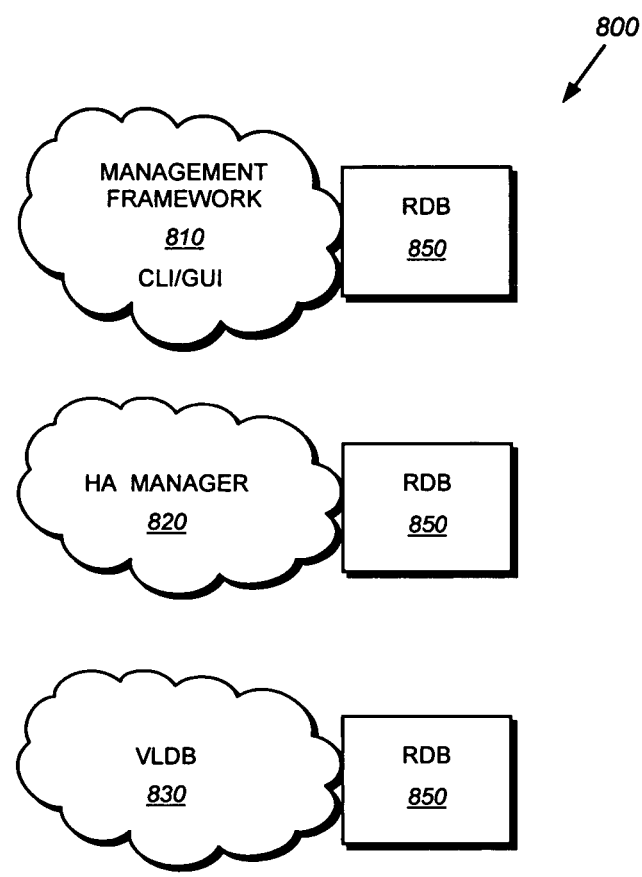
FIG. 8 is a schematic block diagram illustrating a collection of management processes that may be advantageously used with the present invention.

FIG. 8 is a schematic block diagram illustrating a collection of management processes that execute as user mode applications 800 on the storage operating system 400 to provide management of configuration information (i.e. management data) for the nodes of the cluster. To that end, the management processes include a management framework process 810, a high availability manager (HA Mgr) process 820, a VFS location database (VLDB) process 830 and a replicated database (RDB) process 850. The management framework 810 provides a user interface via a command line interface (CLI) and/or graphical user interface (GUI). The management framework is illustratively based on a conventional common interface model (CIM) object manager that provides the entity to which users/system administrators interact with a node 200 in order to manage the cluster 100.

The HA Mgr 820 manages all network addresses (IP addresses) of all nodes 200 on a cluster-wide basis. For example, assume a network adapter 225 having two IP addresses (IP1 and IP2) on a node fails. The HA Mgr 820 relocates those two IP addresses onto another N-blade of a node within the cluster to thereby enable clients to transparently survive the failure of an adapter (interface) on an N-blade 110. The relocation (repositioning) of IP addresses within the cluster is dependent upon configuration information provided by a system administrator. The HA Mgr 820 is also responsible for functions such as monitoring an uninterrupted power supply (UPS) and notifying the D-blade to write its data to persistent storage when a power supply issue arises within the cluster.

The VLDB 830 is a database process that tracks the locations of various storage components (e.g., a VFS) within the cluster 100 to thereby facilitate routing of requests throughout the cluster. In the illustrative embodiment, the N-blade 110 of each node has a look up table that maps the VFS ID 702 of a file handle 700 to a D-blade 500 that "owns" (is running) the VFS 380 within the cluster. The VLDB provides the contents of the look up table by, among other things, keeping track of the locations of the VFSs 380 within the cluster. The VLDB has a remote procedure call (RPC) interface, e.g., a Sun RPC interface, which allows the N-blade 110 to query the VLDB 830. When encountering a VFS ID 702 that is not stored in its mapping table, the N-blade sends an RPC to the VLDB process. In response, the VLDB 830 returns to the N-blade the appropriate mapping information, including an identifier of the D-blade that owns the VFS. The N-blade caches the information in its look up table and uses the D-blade ID to forward the incoming request to the appropriate VFS 380.

All of these management processes have interfaces to (are closely coupled to) a replicated database (RDB) 850. The RDB comprises a library that provides a persistent object store (storing of objects) for the management data processed by the management processes. Notably, the RDB 850 replicates and synchronizes the management data object store access across all nodes 200 of the cluster 100 to thereby ensure that this RDB database is identical (has an identical image) on all of the nodes 200. For example, the HA Mgr 820 uses the RDB library 850 to monitor the status of the IP addresses within the cluster. At system startup, each node 200 records the status/state of its interfaces and IP addresses (those IP addresses it "owns") into the RDB database.

Operationally, requests are issued by clients 180 and received at the network protocol stack 430 of an N-blade 110 within a node 200 of the cluster 100. The request is parsed through the network protocol stack to the appropriate NFS/CIFS server, where the specified VFS 380 (and file), along with the appropriate D-blade 500 that "owns" that VFS, are determined. The appropriate server then translates the incoming request into a SpinFS request 600 that is routed to the D-blade 500. The D-blade receives the SpinFS request and apportions it into a part that is relevant to the requested file (for use by the inode manager 502), as well as a part that is relevant to specific access (read/write) allocation with respect to blocks on the disk (for use by the Bmap module 504). All functions and interactions between the N-blade 110 and D-blade 500 are coordinated on a cluster-wide basis through the collection of management processes and the RDB library user mode applications 800.

F. Storage Pool Indexing

Figure 9:
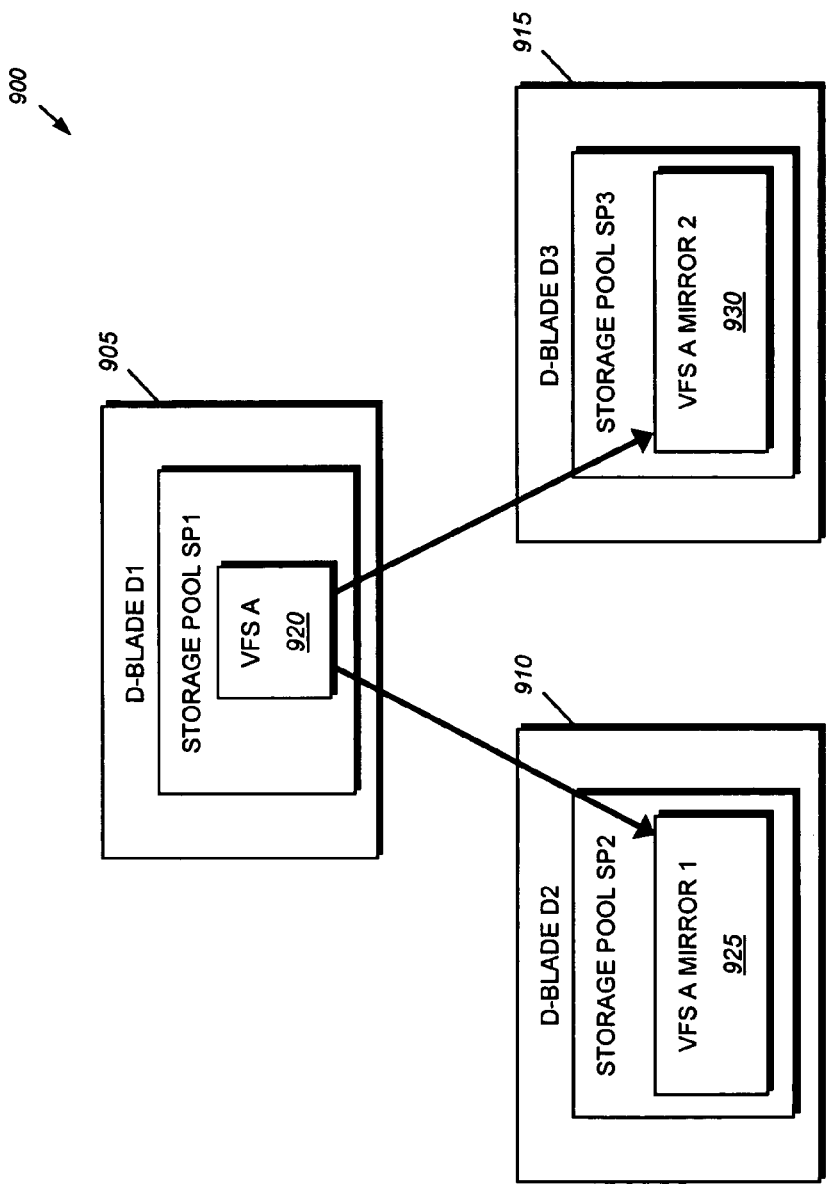
FIG. 9 is a schematic block diagram of an exemplary mirroring environment in accordance with an embodiment of the present invention.

FIG. 9 is a schematic block diagram of an exemplary mirroring environment 900 in accordance with an embodiment of the present invention. The environment 900 includes D-blade D1 having storage pool SP1, D-blade D2 having storage pool SP2 and D-blade D3 having storage pool SP3. Storage pool SP1 contains VFS A 920, which is mirrored (e.g., copied) to a first mirror (VFS A Mirror 1 925) on storage pool SP2 and a second mirror (VFS A Mirror 2 930) on storage pool SP3. As a result of the mirroring relationship, each VFS 920, 925 and 930 has an identical VFS ID. Moreover, as each VFS 920, 925, 930 is served by a separate D-blade; accordingly read requests directed to any of the VFS's are forwarded by an N-blade (not shown) to the appropriate D-blade for processing. Assume that D-blade D3 fails and storage pool SP3 relocates to D-blade D2, or that storage pool SP3 relocates to D-blade D2, not because of a failure to D-blade D3 but due to, e.g., load balancing purposes. As a result, D-blade D2 owns two storage pools SP2 and SP3 that contain VFS's with identical VFS IDs (mirror VFS's 925 and 930). Prior to the invention described herein, only one of the mirror VFS's would be mounted.

Figure 10:
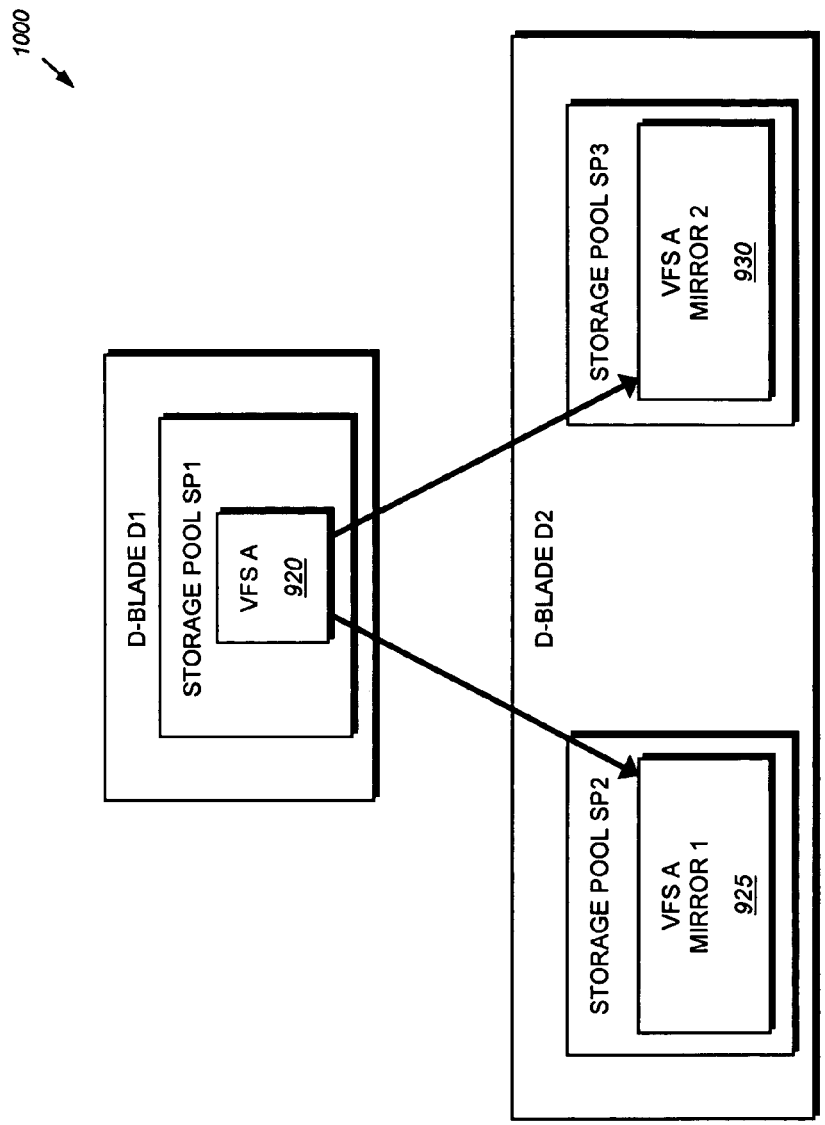
FIG. 10 is a schematic block diagram of another exemplary mirroring environment in accordance with an embodiment of the present invention.

FIG. 10 is a schematic block diagram of another exemplary mirroring environment 1000 in accordance with an embodiment of the present invention. Here, D-blade D2 owns storage pool SP2 and storage pool SP3. Previously storage system 200 could not concurrently service client requests directed to both mirrors because of the inability to distinguish between the associated VFS's. As a result, D-blade D2 of storage system 200 would only mount one of the mirror VFS's to avoid having multiple mounted VFS's with identical VFS IDs. The other mirrored VFS's would not be mounted nor would they be accessible to data access operations. Typically the D-blade would mount the first mirror VFS identified. In such previous implementations, VFS A Mirror 2 930 would be inaccessible.

The present invention is directed to a technique for permitting a storage system to concurrently service client requests directed to a plurality of virtual file systems (VFS's) having identical VFS identifiers. As noted, the inventive technique supports processing of both read requests to retrieve data from the VFS and operations to store dirtied data to the VFS's. When processing read requests directed to a VFS mirror, the storage system selects the most recently modified VFS mirror from which to retrieve the requested data. This selection is made by examining, e.g., VFS meta data stored in an inode describing the VFS. This aspect of the technique provides transparent client access to the VFS mirrors and ensures that clients receive the most up to date data in response to the read request.

When processing data associated with a VFS, a data frame descriptor data structure, which is utilized for tracking in-memory data buffers, is modified to include a storage pool (SP) index value. The SP index value is utilized to access an entry of a SP index array to identify a SP descriptor. The SP descriptor includes a SP identifier that uniquely identifies the storage pool associated with the contents of the data buffer. Thus, the data frame descriptor includes meta data to identify the VFS and the storage pool associated with the in-memory buffer. When a data buffer is dirtied by, e.g., a change in meta data due to a file system operation, the data frame descriptor is configured with the appropriate SP index to uniquely identify the appropriate VFS mirror that is to be modified. When data is modified, the in-memory copy of the data is first modified. At some later point in time, the in-memory copy is flushed (written) to disk. Until this flushing occurs, the in-memory data is marked as dirty, however, once the in-memory copy has been written to disk so that the in-memory and on-disk copies are identical, the in-memory copy of the data is now "clean." The storage system utilizes the combination of the VFS ID from the data frame descriptor and the SP ID from the SP index value to differentiate among a plurality of VFS's with identical VFS IDs.

Figure 11:
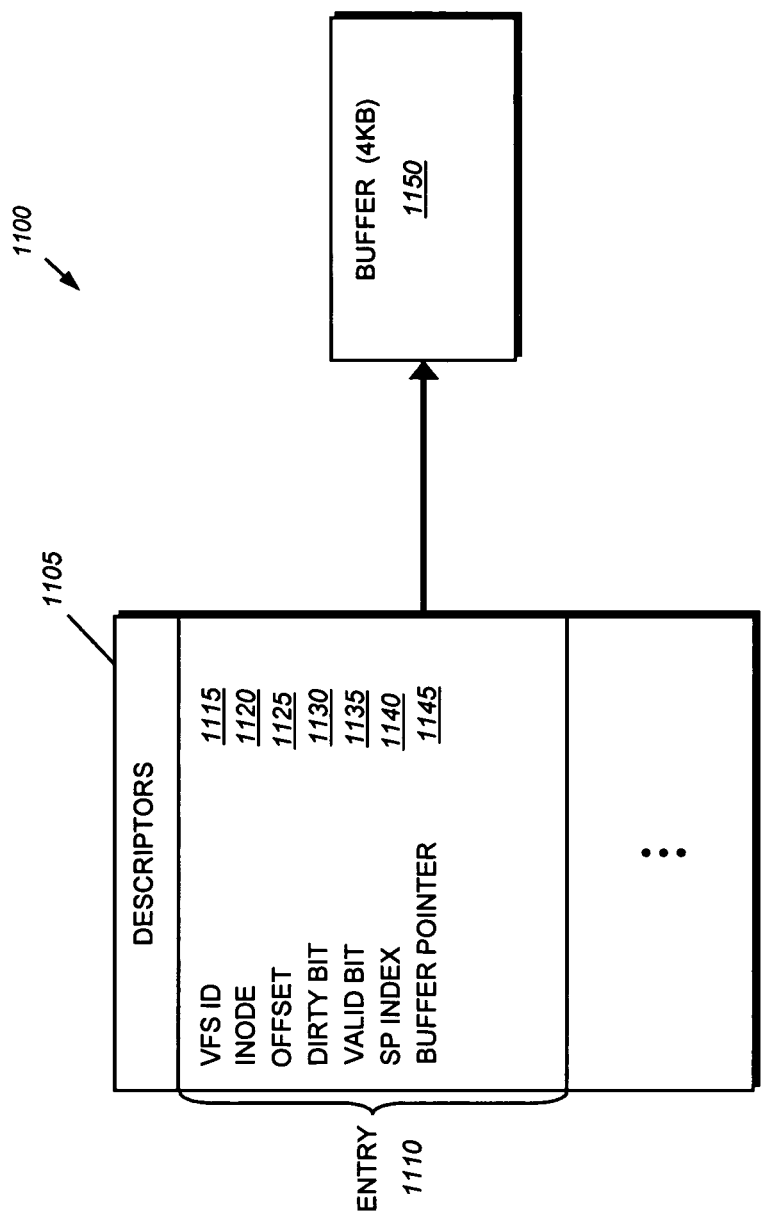
FIG. 11 is a schematic block diagram of an exemplary data frame and associated buffer in accordance with an embodiment of the present invention.

FIG. 11 is a schematic block diagram of an exemplary data frame descriptor 1105 and associated data buffer 1150 in accordance with an embodiment of the present invention. When data in a VFS is dirtied by, for example, a change in metadata, the new data is stored in an in-memory data buffer 1150 before being written to disk. The data buffer is illustratively 4 KB in size to comport with the write size of the file system. It should be noted that in alternate embodiments the data buffer 1150 may be of any size that can be accommodated by the file system write allocation processes. The data descriptor array 1105 includes a number of entries 1110, each of which is associated with a data buffer 1150. Each entry 1110 includes a VFS ID field 1115, an inode field 1120, an offset field 1125, a dirty bit field 1130, a valid bit field 1135, a SP index field 1140 and a buffer pointer field 1145.

The VFS ID field 1115 contains the VFS ID of the VFS associated with the data buffer 1150. The inode field 1120 contains a pointer to the appropriate inode of the VFS to which the data in the data buffer 1150 is to be written. Similarly, the offset field 1125 identifies the offset within the VFS where the data is to be written. The dirty bit field 1130 identifies whether the data in the data block 1150 has been dirtied (modified). The valid bit field 1135 identifies whether the data in the data block 1150 is valid. The SP index field 1140 contains a SP index that identifies an appropriate entry in a SP index array 1205 (in FIG. 12), discussed further below. The SP index field 1140 is utilized to ascertain the proper storage pool associated with a given VFS. The buffer pointer field 1145 contains a pointer to the data buffer 1150.

Figure 12:
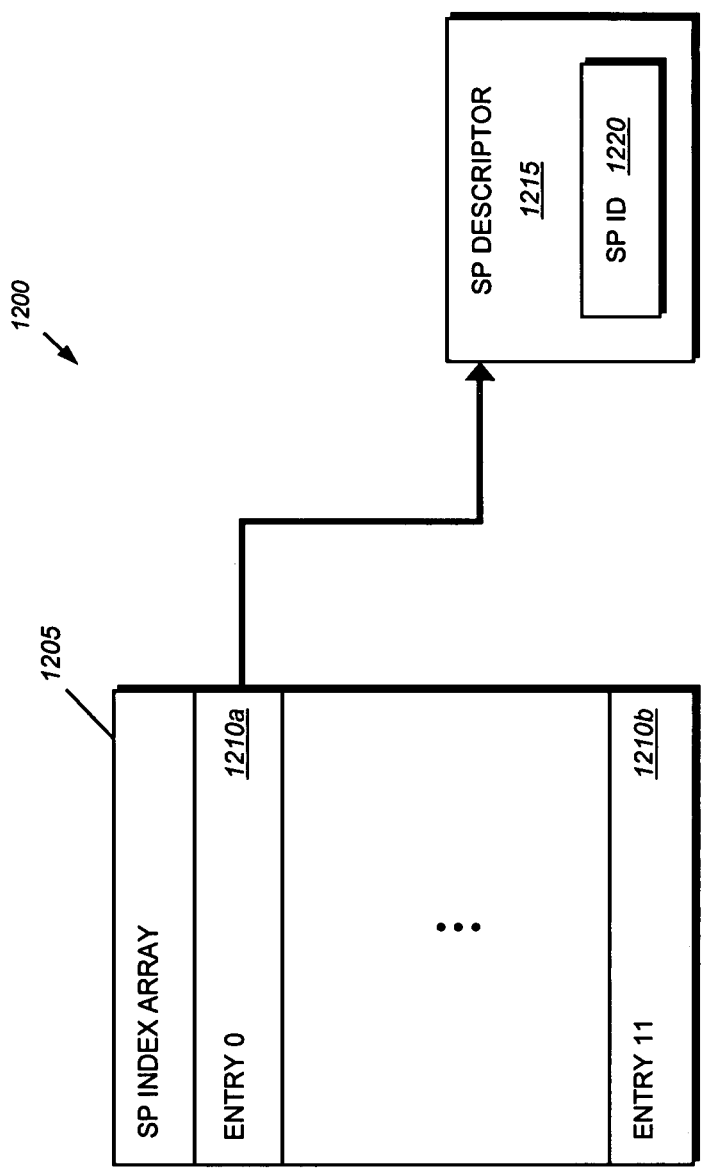
FIG. 12 is a schematic block diagram of an exemplary SP index array and descriptor data structures in accordance with an embodiment of the present invention.

FIG. 12 is a schematic block diagram of an exemplary SP index array 1205 and SP descriptor 1215 in accordance with an embodiment of the present invention. The SP index array 1205 includes a number of entries 1210a,b, each of which is associated with a storage pool served by the D-blade. In the illustrative embodiment, each D-blade may serve up to 12 storage pools; however, in alternate embodiments D-blades may serve any number of storage pools. Each entry, such as entry 1210a, contains a pointer to a SP descriptor 1215 that includes, inter alia, a storage pool ID 1220. Each SP ID 1220 uniquely identifies a storage pool served by the D-blade. In accordance with the present invention, the combination of a SP ID 1220 and a VFS ID 1115 (FIG. 11) uniquely identifies a VFS mirror served by a D-blade.

In accordance with the illustrative embodiment of the present invention, when data from a VFS mirror is dirtied, the D-blade owning the storage pool containing the VFS sets the SP index field 1140 of the data frame descriptor entry 1110 to a value that references the appropriate SP descriptor 1215. By using the VFS ID (which is shared and thus not unique within the D-blade) with the SP ID 1220 contained in the referenced SP descriptor 1215, a D-blade can discern between multiple VFS's contained therein when processing write requests for dirtied data. Thus during write allocation, the D-blade may identify which, of the plurality of the mirror VFS's, is the proper write destination for data in an in-memory data buffer. The novel technique therefore allows a plurality of storage pools, each having a VFS with an identical VFS ID, to be mounted and served by a single D-blade.

Figure 13:
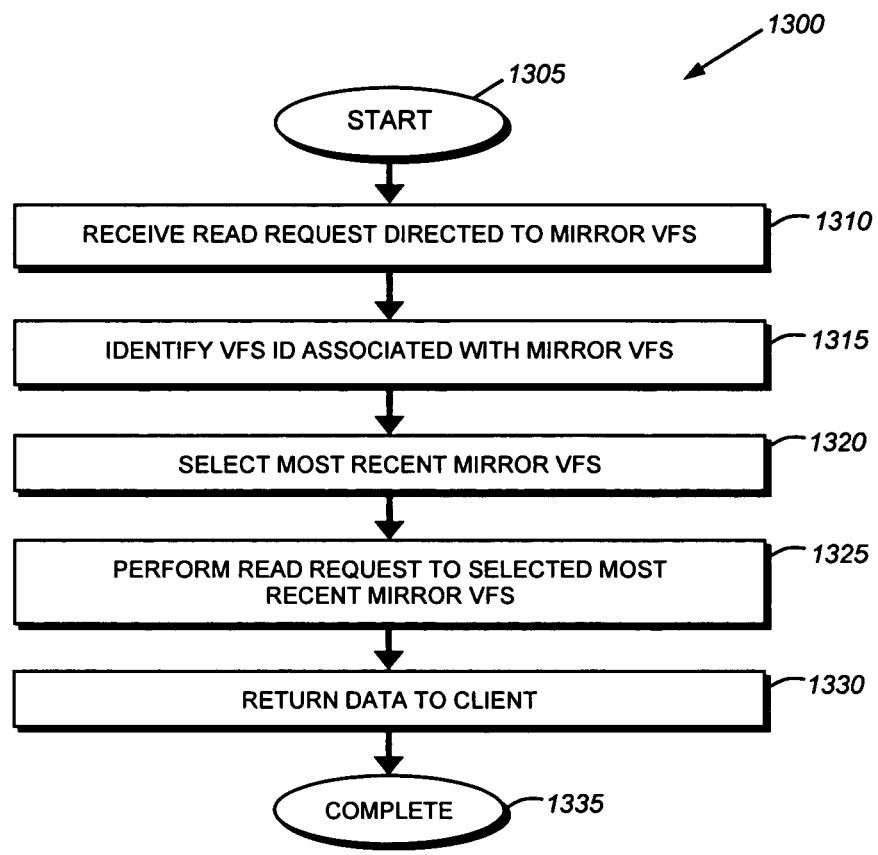
FIG. 13 is a flow chart detailing the steps of a procedure for processing read requests in accordance with an embodiment of the present invention.

FIG. 13 is a flowchart detailing the steps of a procedure 1300 for processing data access read requests directed to a VFS mirror in accordance with an embodiment of the present invention. The procedure starts in step 1305 and continues to step 1310 where a read request directed to a VFS mirror is received at the storage system 200. This read request may be received from, e.g., a client of the storage system using a conventional file level protocol, such as the Network File System (NFS) or Common Internet File System (CIFS) protocols. The VFS ID associated with the VFS mirror is then identified by the appropriate NFS/CIFS server 422, 420 in step 1315. The VFS ID may be obtained by examining the contents of the VFS ID field 702 of the file handle 700 associated with the read request. The read request is then forwarded (as a translated SpinFS request 600) to an appropriate D-blade where, in step 1320, the most recently modified VFS mirror is selected and the read request is performed to that selected VFS mirror in step 1325. The most recent VFS mirror is selected to ensure that the most up-to-date data is served to the client. This determination may be performed by, e.g., examining metadata in the inode associated with the VFS mirror to determine when it was last modified. The data is then returned to the client in step 1330 before the procedure 1300 ends in step 1335.

To again summarize, the present invention provides a technique for permitting multiple VFS's with identical VFS IDs to be served by the same D-blade. A data frame descriptor includes a SP index field that identifies an entry in an SP index array. The entry in the SP index array points to a SP descriptor that includes a SP ID. The D-blade may, by using the SP ID from the SP descriptor and the VFS ID from the data frame descriptor, uniquely identify a VFS even if it has the same VFS ID as other VFS's being served by the D-blade. It should be noted that while this description has been written in terms of VFS's the principles of the present invention may be utilized with any appropriate data container, such as a virtual volume, a qtree or other unit of data storage.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-blades, the teachings of the present invention are equally suitable to systems where the functionality of the N and D-blades are implemented in a single system. Alternately, the functions of the N and D-blades may be distributed among any number of separate systems wherein each system performs one or more of the functions. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for serving, by a storage system having a processor and a memory, a first virtual file system and a second virtual file system, the method comprising:
  organizing a plurality of storage devices connected to the storage system into a plurality of storage pools, wherein each storage pool hosts a different virtual file system;
  configuring the first virtual file system and the second virtual file system with a virtual file system identifier that is the same;
  creating a data frame descriptor storing the virtual file system identifier and a storage pool index value, the storage pool index value identifying a unique storage pool identifier associated with each storage pool; and
  utilizing the virtual file system identifier from the data frame descriptor in conjunction with the storage pool identifier identified from the storage pool index value to uniquely identify the first virtual file system or the second virtual file system that have the virtual file system identifier that is the same.

2. The method of claim 1 wherein the storage system comprises a D-blade.

3. The method of claim 2, wherein the first virtual file system and the second virtual file system are mounted and served by the D-blade.

4. The method of claim 2, wherein the first virtual file system and the second virtual file system are mounted and served by a D-blade.

5. The method of claim 1 further comprising:
  determining which of the first virtual file system and the second virtual file system has been most recently updated;
  in response to determining that the first virtual file system has been most recently updated, processing a read request using the first virtual file system; and
  in response to determining that the second virtual file system has been most recently updated, processing the read request using the second virtual file system.

6. The method of claim 5, wherein the determining further comprising:
  examining virtual file system metadata in an inode to determine which of the first virtual file system and the second virtual file system has been most recently updated.

7. The method of claim 1, wherein the second virtual file system represents a point-in-time image of the first virtual file system.

8. The method of claim 1, further comprising:
utilizing the virtual file system identifier from the data frame descriptor in conjunction with the storage pool identifier identified from the storage pool index value to process a write request.

9. The method of claim 1, further comprising:
concurrently servicing data access requests to the first virtual file system and the second virtual file system with the virtual file system identifier that is the same.

10. A non-transitory computer readable storage medium containing program instructions executed by a processor, comprising:
program instructions that configure a storage system storing a first virtual file system and a second virtual file system sharing a virtual file system identifier that is the same;

program instructions that organize a plurality of storage devices connected to the storage system into a plurality of storage pools, wherein each storage pool hosts a different virtual file system;

program instructions that create a data frame descriptor having the virtual file system identifier and a storage pool index value, the storage pool index value identifying a unique storage pool identifier associated with each storage pool; and program instructions that utilize the virtual file system identifier from the data frame descriptor in conjunction with the storage pool identifier identified from the storage pool index value to uniquely identify the first virtual file system or the second virtual file system.

* * * * *